United States Patent Office 2,731,414
Patented Jan. 17, 1956

2,731,414

WATER FLOODING SECONDARY RECOVERY METHOD

George G. Binder, Jr., Robert C. West, and Kurt H. Andresen, Tulsa, Okla., assignors to Esso Research and Engineering Company, a corporation of Delaware No Drawing. Application February 5, 1952, Serial No. 270,116

5 Claims. (Cl. 252—8.55)

This invention concerns an improved method of conducting secondary recovery operations in oil production. The method of this invention concerns water flooding operations in which a viscous aqueous solution is injected into the formation prior to application of a water flood treatment. Use of what may be described as a highly viscous aqueous plug in the forefront of the water flood is effective in a variety of ways to increase the rate of oil production and ultimate oil recovery in secondary recovery operations.

While there have been substantial advances in what are called "primary recovery" techniques in producing oil, nevertheless a substantial portion of oil is known to remain in the earth after termination of primary recovery methods. As a rule of thumb, it has been observed that of the total amount of oil in a given petroleum reservoir, only about ⅓ of this oil may be economically recovered by primary recovery methods. Somewhat more than this amount may be obtained by following improved primary recovery practices, such as re-pressuring treatments, etc. It is nonetheless true that substantial quantities of oil cannot be produced from oil reservoirs within the economically practicable limits of primary recovery methods.

For this reason there is a great deal of interest in what are known as "secondary recovery" methods. Secondary recovery may be defined as the augmentation of remaining reservoir energy after depletion by primary recovery methods. The reservoir energy is augmented by drilling one or more injection wells into a permeable oil bearing formation within suitable proximity to a producing well or wells which are drilled into this same permeable oil bearing formation. Injection of liquids or gases through the injection well is generally effective in increasing the oil production from the producing well or wells. This technique of secondary recovery enables the recovery of substantially more oil than can be produced by primary recovery methods.

The possibility of improving secondary recovery methods is an attractive possibility as a means of conserving oil reserves. Furthermore, the oil which may be produced by secondary recovery techniques does not require discovery, so that the additional quantities of oil which may be obtained by secondary recovery procedures do not have to provide for exploration and leasing expenses to yield a profit. Again it is generally true that drilling and operational expenses favor secondary recovery operations. It is nonetheless true, however, that development and operating expenses still determine the success or failure of a secondary recovery operation.

One of the practical methods of secondary recovery which has long been employed is so-called "water-flooding." In this general method water is the fluid which is pumped through an injection well and into a permeable oil bearing formation which has been penetrated by producing wells that have been depleted by primary recovery methods. For many years now water flooding has been employed so as to permit production of substantial increments of oil from depleted wells. However, it is appreciated that presently known water flooding techniques are not as effective as might be desired. In this connection, for example, it is generally true that of the total oil originally present in a reservoir, after primary recovery methods and after water flooding secondary recovery techniques, some 33% or more of the oil may still remain in the reservoir. Thus water flooding techniques, like primary recovery methods, have definite economic limits of application which presently necessitate termination of oil production substantially before all recoverable oil is obtained.

It is therefore the object of this invention to improve conventional water flooding practices. As will be brought out this invention has many advantages, all of which lead to and contribute to permitting greater ultimate oil recovery than heretofore obtainable in water flooding operations.

In order to understand the nature of this invention and the advantages provided thereby, it is necessary to appreciate some of the basic factors involved in secondary recovery operations. Oil bearing permeable formations cannot be considered as having a homogeneous nature either as regards porosity or permeability. Thus it is well known that the permeability profiles of all pay sands show irregularities both horizontally and vertically. In part these irregularities reflect varying conditions of sedimentation. Again oil bearing strata may be separated by shale streaks which prevent vertical migration between them, providing independent paths between an injection well and producing wells. Frequently these independent paths will have differing effective permeabilities. These and other factors result in the watering out of certain portions of an oil bearing formation prior to the watering out of other portions during water flooding. When this occurs, water passing through a watered out stratum results in oil production at increasingly unfavorable water-to-oil ratios. This water by-passing often becomes a controlling factor in determining the final recovery which may economically be obtained by water flooding operations. This is particularly true when the oil sand is highly heterogeneous.

Again, as a result of the factors referred to, the shape of the area within a reservoir which is swept by an advancing front of the injected water may be such that large quantities of recoverable oil will not be affected by the water flood. In other words, the areal sweep efficiency of the water flood may be poor.

Appreciating these and other deficiencies in the manner in which water floods are effected in secondary recovery, many suggestions have been made to improve water flooding. For example, it has been suggested to secure selective plugging of the permeable oil bearing formation being treated so as to partially seal off the more permeable paths for water coursing. However selective plugging techniques are generally expensive and require close control. At best, selective plugging can only be achieved adjacent to either the injection well or the producing well and cannot be effective through the main body of the oil bearing formation. Vertical permeability some distance from the injection or producing wells may cause the favorable effects of selective plugging to be nullified to a great extent.

Reference has particularly been made to the possibility of improving water flooding by selective plugging of an oil formation since the process of this invention has much the same objectives but functions in a totally different manner. Thus, for example, the process of this invention is effective throughout the entire reservoir and is not limited to the immediate vicinity of the well bores. Again, unlike selective plugging procedures, the process of this invention does not depend upon sealing off strata of the highest permeabilities, but rather favors water penetration into strata of lower permeabilities. It is important to bear these and other distinctions in mind in considering the process of this invention.

The water flooding technique of this invention is fundamentally simple in operation. Before the process may be applied, the nature of the reservoir to be processed is studied as conventionally carried out in secondary recovery operations. Factors which must be considered are the amount of water present in the formation, the viscosity of the oil present, the porosity and permeability characteristics of the formation, etc. In light of knowledge as to these factors a body of aqueous solution is prepared, dependent in viscosity and amount upon the factors referred to. This aqueous viscous fluid is then injected into the injection system of a secondary recovery operation. Thereafter conventional water flooding is carried out by pumping water through the injection wells employed for the introduction of the viscous aqueous solution. The viscous aqueous solution is thus forced through the formation at the forefront of the water flood. It may be considered that the body of viscous aqueous solution serves as a seal or plug between oil forced through the reservoir to a producing well and the water flood which follows the viscous aqueous plug.

The conduct of water flooding by this general technique is effective to improve oil recovery in many ways. It is now well appreciated, and may theoretically and practically be demonstrated, that oil displacement in an oil bearing formation is directly affected by the viscosity of the displacing liquid phase. Thus, when a body of liquid is employed in a secondary recovery operation to force oil toward a producing well, substantially better displacement of the oil is obtained if the ratio of the viscosity of the driving liquid to the oil is high. If this ratio between the viscosity of the driving agent and the viscosity of oil is increased to a value substantially greater than unity, a piston-like displacement of the oil becomes practicable. Again the areal sweep efficiency formerly referred to is substantially improved when the ratio of the viscosity of the driving agent to the viscosity of oil is increased.

Practically it is difficult to substantially effect the ratio referred to in secondary recovery operations. It is impractical or unduly expensive to materially change the viscosity of the oil in the formation. The alternative of increasing the viscosity of the driving agent is also limited by practical considerations. If an extremely viscous driving agent were to be employed in a secondary recovery operation, the viscosity of this agent would be so great as to seriously delay or prevent passage of the driving agent through the formation. The advantages to be achieved by favorably effecting the ratio referred to would therefore be virtually offset by the prolonged time period required to carry out the secondary recovery operation. Again the volume of fluid required in secondary recovery operations is so great as to discourage necessity for selecting or treating the fluid so as to have the high viscosity desired. However, it has now been established that the viscosity ratio referred to controls oil displacement and sweep efficiency by virtue of its effect at or adjacent to the boundary between the oil and the driving agent. This consideration makes it practical and attractive, in accordance with this invention, to substantially secure the advantages which can be obtained by materially increasing the ratio between the viscosity of the total volume of the driving agent and the viscosity of oil. Thus, by maintaining the plug of viscous aqueous material between the oil being displaced and the front of the water flood, it is possible to obtain nearly piston-like oil displacement and substantially greater areal sweep efficiency. Both of these factors are evidently closely related to the ultimate oil recovery which may be obtained, and do much to establish the practical advantages of this invention.

The process of this invention provides other important advantages which may in part be considered as concomitant with the advantages referred to. Thus this process is particularly advantageous in the treatment of oil reservoirs containing oil of a high viscosity. Conventional water flooding methods are least effective in this case; in part due to the difficulty of securing satisfactory oil displacement and sweep efficiency. This effect is probably related to the ratio referred to as it will be seen that in the case of a highly viscous oil the value of this ratio may be considerably less than one. However, when a viscous aqueous plug is employed as a driving agent at the oil interface, it is apparent that this viscosity ratio may be maintained at a high value even in the case of viscous oils.

As formerly observed, a complicating factor in securing satisfactory water flooding concerns differences in horizontal permeability in an oil reservoir. In any case in which there are substantial differences in horizontal permeability, water by-passing, that is the passage of water through a watered-out path, generally results. As noted, this may cause practical termination of water-flooding operations due to the excessively high water-to-oil ratio of fluid recovered from producing wells affected.

The process of this invention effectively overcomes this effect attributable to differences in permeability. Consider that two adjacent strata exist having substantially different effective permeabilities and that these two strata are separated by shale, for example, so as to prevent vertical migration between them. In a conventional water flooding operation, water will preferentially water-out the more permeable of these strata providing a water channel which may result in substantial water production and unsatisfactory oil recovery. In the case of this invention, however, introduction of the viscous aqueous plug to the two strata will result in the following situation: At the time of injection of the viscous plug, due to the difference in permeabilities of the two strata referred to, a substantially greater amount of the viscous plug will penetrate the more permeable of the two strata. If the two strata differ greatly in permeability, very little of the highly viscous aqueous solution will enter the less permeable stratum. Consequently, when water flooding operations are initiated, the water front will encounter a first stratum which impedes water penetration due to the viscous nature of the water plug present in this stratum. The water front will have a correspondingly greater endency to penetrate what was originally the less permeable of the two strata, since this stratum will contain relatively little of the viscous aqueous solution. As a result, penetration of the water flood front will be substantially equalized between these two strata.

This same effect will clearly result in cases of differing vertical permeabilities.

It is particularly notable that differences in permeability of portions of an oil bearing stratum are automatically adjusted by this mechanism. Thus, regardless of the degree of variation in permeabilities existent, the initial injection of the viscous aqueous plug referred to will be effective in a self-adjusting manner to equalize the subsequent water flood front through the formation.

It is apparent that the improved oil displacement, areal sweep efficiency, and ultimate oil recovery obtainable by the process of this invention results in many secondary advantages. Operating costs connected with secondary recovery may be substantially reduced. Because of the increased efficiency of oil displacement lesser quantities of water are required for the water flooding operations conducted after injection of the viscous aqueous plug. This provides savings in costs of water handling, treating, and losses due to corrosion. Again, since water-to-oil ratios in the production wells are maintained at a lower value, attractive oil production rates may be maintained for greater periods of time. These and other practical advantages may be obtained.

In preparing a suitable viscous aqueous solution for use as contemplated herein, it is critical that this aqueous solution should have a viscosity above about 100 centipoises and not substantially higher than 1000 centipoises. In the case in which an aqueous plug is employed having a viscosity greater than about 1000 centipoises, the advantages referred to are substantially nullified by the difficulty or impossibility of driving this viscous plug into the formation. Consequently, it is important in the practice of this invention to employ an aqueous plug having a viscosity no greater than about 1000 centipoises.

At the same time, in order to obtain the desired objectives, the viscosity of the aqueous solution must be greater than about 100 centipoises. It has been determined that this viscosity is a practical lower limit in attempting to improve oil displacement and sweep efficiency. This is in part related to considerations based on the ratio between the viscosity of the driving agent and the viscosity of oil. Consequently, as stated, in the practice of this invention, an aqueous viscous solution is to be prepared having a viscosity in the range of about 100 to 1000 centipoises.

It has been found that certain agents are particularly effective in increasing the viscosity of water so as to form a highly viscous aqueous solution for use in this invention. These agents have the property of dissolving in water so as to increase the viscosity of water in a substantially semi-logarithmic relation with concentration. As a result, exceedingly small proportions of these agents are operative to increase the viscosity of water sufficiently for use in this invention. For example, it has been found that 1% of locust bean gum, 1.3% of gum Karaya or 1 to 2% of carboxy methyl cellulose will each serve to increase the viscosity of water to about 1000 centipoises. Irish moss is another example of a material which is qualified for use, 0.5% to 1% of this material furnishing solutions having viscosities of from about 100 to about 500 centipoises. It is apparent that in these concentrations it becomes economically practical to provide a sufficiently viscous aqueous solution to achieve the benefits of this invention.

A point not heretofore brought out is that the plug employed must be aqueous in nature. Thus it is not sufficient to simply employ a highly viscous medium as a plug in the general manner referred to unless this medium is aqueous in character. Since the volume of the plug employed is relatively small in proportion to the volume of water employed in water flooding, it is important to maintain an effective drive of the plug by the water flood so as to maintain the partition between the water flood front and the displaced oil. In other words, the characteristics of the viscous plug as regards displacement by the following water flood must be considered. In this connection it has been determined that displacement is best when the viscous phase employed as a plug is completely miscible with the water employed as a flooding agent. For this reason therefore it is important to observe that the viscous plug referred to should be aqueous in character and consequently should constitute an aqueous solution. As indicated, it has now been determined that if the viscous plug is aqueous, effective displacement of this plug may be achieved in the water flooding operation. It therefore becomes practical to substantially maintain the placement of the aqueous viscous plug between the displaced oil and the advancing front of the water flood.

It is apparent that the amount of aqueous viscous plug to be employed cannot be arbitrarily defined for all secondary recovery operations. For example, this will depend upon the distance between an injection well and producing wells and will depend upon permeability variations of the formation therebetween. In order to secure simultaneous arrival of the water flood front through both low and high permeability strata at the production well the viscosity of the aqueous plug and the quantity of the aqueous plug must be critically selected. It therefore becomes necessary in any given secondary recovery operation to consider the nature of the local factors existing so as to best determine both the viscosity and quantity of aqueous plug to be employed. However, it may be brought out that in general, the amount of the aqueous viscous phase should be about 0.05 to 0.3 of the volume of hydrocarbon pore space present in the reservoir affected by the secondary recovery operations. More specifically, the amount of aqueous plug generally falls in the range of about 0.1 to 0.2 of the volume of hydrocarbon pore space. The aqueous plug should be injected into the injection well at the greatest practical pressure, limited only by the break through or rupture characteristics of the formation. In general this requires an injection pressure not greater than about 0.8 pound per square inch per foot of depth.

Insofar as the process described is complementary to conventional water flooding operations, it is apparent that the general principles affecting water flooding are to be followed. Thus, for example, the water to be used as a flooding agent after injection of the aqueous plug must be satisfactorily purified, must be injected at a satisfactory rate, etc. As these factors are no part of the present invention it is not considered necessary to review them.

It should be observed that the principles of this invention may be adopted to improve oil recovery after a conventional water flood treatment has been started. Again the treatment described may be repeated several times in the course of a secondary recovery operation. The process of this invention is compatible with these operations so that whenever applied, water-to-oil ratios at producing wells may be lowered and the other benefits of this invention may at least in part be achieved.

What is claimed is:

1. In a secondary recovery process in which at least one injection well is drilled into an oil bearing formation penetrated by at least one producing well, the steps which comprise injecting a body of viscous aqueous solution into said injection well, said body of viscous solution having a volume of about 0.05 to 0.3 of the hydrocarbon pore space of the formation being treated, and said aqueous solution having a viscosity in the range of about 100 to 1000 centipoises, and thereafter injecting water into said formation through the injection well whereby oil in the formation is displaced by the viscous aqueous solution which in turn is displaced by water.

2. The process defined by claim 1 in which the said viscous solution is an aqueous solution of carboxy methyl cellulose.

3. The process defined by claim 1 in which the said viscous solution is an aqueous solution of locust bean gum.

4. The process defined by claim 1 in which the said viscous solution is an aqueous solution of gum Karaya.

5. The process defined in claim 1 in which the said viscous solution is an aqueous solution of Irish moss.

References Cited in the file of this patent

UNITED STATES PATENTS

| | | |
|---|---|---|
| 2,341,500 | Detling | Feb. 8, 1944 |
| 2,543,868 | Prokop | Mar. 6, 1951 |
| 2,596,137 | Fast | May 13, 1952 |